United States Patent [19]
Boden et al.

[11] Patent Number: 5,370,820
[45] Date of Patent: Dec. 6, 1994

[54] CONDUCTING LIQUID CRYSTALS

[75] Inventors: Neville Boden; Richard J. Bushby, both of Leeds; Jonathan Clements, Wakefield; Peter F. Knowles; Malini V. Jesudason, both of Leeds, all of England

[73] Assignee: British Technology Group Ltd., London, England

[21] Appl. No.: 51,796

[22] Filed: Apr. 26, 1993

Related U.S. Application Data

[63] Continuation of Ser. No. 921,595, Jul. 28, 1992, abandoned, which is a continuation of Ser. No. 781,672, Oct. 24, 1991, abandoned, which is a continuation of Ser. No. 414,149, Sep. 28, 1989, abandoned.

[30] Foreign Application Priority Data

Oct. 10, 1988 [GB] United Kingdom ............... 8823721

[51] Int. Cl.$^5$ ............... C09K 19/52; C09K 19/06; C09K 19/12
[52] U.S. Cl. ............... 252/299.01; 252/299.6; 252/299.66
[58] Field of Search ............ 252/299.01, 299.6, 299.66

[56] References Cited

U.S. PATENT DOCUMENTS

| | | | |
|---|---|---|---|
| 4,333,709 | 6/1982 | Dubois et al. | 350/350 R |
| 4,657,694 | 4/1987 | Heeger et al. | 252/299.01 |
| 4,865,762 | 9/1989 | Kreuder et al. | 252/299.01 |
| 4,980,081 | 12/1990 | Ringsdorf et al. | 252/299.01 |
| 5,008,040 | 4/1991 | Tsukamoto | 252/500 |

FOREIGN PATENT DOCUMENTS 0106175 4/1984 European Pat. Off.
3625154A1 1/1988 Germany.

OTHER PUBLICATIONS

Drenth et al., Recl. Tran. Chim. Pays-Bas, 106, p. 534 (1987).
Chiang, L. Y. et al "Charge transfer salts of . . . " Molecular Crystals and Liquid Crystals, vol. 125, Montreux CH, pp. 279-288.

Primary Examiner—Robert L. Stoll
Assistant Examiner—C. Harris
Attorney, Agent, or Firm—Nixon & Vanderhye

[57] ABSTRACT

A semi-conducting liquid crystalline material exhibiting anisotropic conduction properties. The material comprises a radical salt of a disc-like mesogen and a dopant which is an oxidizing or a reducing agent. Not more than 0.5 moles of dopant per mole of mesogen are present.

15 Claims, 4 Drawing Sheets

CONDUCTING LIQUID CRYSTALS

This is a continuation of application Ser. No. 07/921,595, filed Jul. 28, 1992, now abandoned, which is a Rule 62 continuation of U.S. Ser. No. 07/781,672, filed Oct. 24, 1991, now abandoned, which is a Rule 62 continuation of U.S. Ser. No. 07/414,149, filed Sep. 28, 1989, now abandoned.

This invention relates to novel materials which a semi-conducting liquid crystals, and to electronic devices incorporating these novel materials.

BACKGROUND OF THE INVENTION

Conventional thermotropic liquid crystals are electrical insulators. Electronically conducting liquid crystals have been recognised as potentially valuable entities combining the properties of a semi-conductor with those of a liquid crystal. Attempts to prepare such a material have met with limited success. Mesogens containing a metal atom exhibit very low isotropic conductivity and charge transfer complexes of mesogen molecules exhibit lower conductivity in the liquid crystalline phase than in the solid phase. Drenth et al (Recl. Trav. Chim. Pays-Bas, 106, (1987) 534) reported that doping a hexa alkoxytriphenylene mesogen with 0.7 moles of iodine per mole of mesogen increases the conductivity but that the doped product exhibits isotropic ionic conduction properties.

DESCRIPTION OF THE INVENTION

We have now discovered that semi-conducting liquid crystals capable of exhibiting anisotropic electronic conduction properties can be produced by introducing a quantity of dopant which can be much smaller than utilised by Drenth so as to form a material which comprises a radical salt of the mesogen. Accordingly from one aspect our invention provides a semi-conducting liquid crystal which comprises a radical salt of a mesogen.

The mesogens from which the novel liquid crystals of this invention may be produced are those thermotropic mesogens which are capable of forming a radical salt, i.e. either a radical anion or a radical cation. Preferably the radical salts are stable. The mesogens capable of forming such salts preferably comprise aromatic moieties as part of their molecular structure since the charge on the radical can then be delocalised over the aromatic ring or rings. The mesogens may be those which form a columnar mesophase a smectic phase, or may be those which form a nematic mesophase.

A preferred class of mesogens are the disc-like (discotic) mesogens, e.g. those reported by S. Chandrasekchar in Phil. Trans. R. Soc. London, A 309, 93–103 (1983), which have the following formulae:

(a)

(b)

-continued (c)

(d)

(e)

-continued (f)

(g)

(h)

wherein (a) are the hexa-n-alkanoates of benzene; (b) are the hexa-n-alkanoates of triphenylene and hexa-n-alkoxytriphenylene; (c) are the hexa-n-alkyl and alkoxybenzoates of triphenylene; (d) rufigallol-hexa-n-octanoate; (e) are the hexa-n-alkanoates of truxene the (hexa-n-alkanoates of oxatruxene are also useful); (f) are the 2,2',6,6'-tetra-arylbipyran-4-ylidenes; (g) is uroporphyrin I octa-n-dodecyl ester and (h) is bis(p-n-decylbenzoyl)methanato copper (II).

Examples of other discotic mesogens which have been reported in the literature include:

ARENE CORES

1. R = OCOC$_7$H$_{15}$

-continued

2. R = OCOC$_6$H$_4$OC$_8$H$_{17}$
   R = SC$_6$H$_{13}$

-continued

3. R = OCOC$_{13}$H$_{26}$

ALICYCLIC CORES

4. R = OCOC$_7$H$_{15}$

5. R = OCOC$_{10}$H$_{21}$

6. R = OCOC$_{11}$H$_{23}$

ORGANOMETALLIC CORES

7. R = C$_8$H$_{17}$

-continued

8. R = CH$_2$OC$_{12}$H$_{25}$
M = 2H
M = Cu

9. R = OC$_9$H$_{19}$

HETEROCYCLIC CORES

10. R = COC$_6$H$_4$OC$_{12}$H$_{25}$

POLYMERS

11.

Homologues and analogues of any of these compounds which exhibit a discotic liquid crystal phase are potentially useful according to this invention.

These disc-like mesogens form either columnar or nematic mesophases. The radical salts of such mesogens conduct in only one or in one strongly preferred dimension when appropriately oriented and such oriented materials represent a preferred aspect of the invention.

A further class of mesogens which can form radical salts and from which semi-conducting liquid crystals capable of exhibiting anisotropic electronic conduction properties may be produced are rod-like molecules having a polyaromatic unit as part of their molecular structure such as a polybenzene unit having the following formula:

wherein X represents any suitable end chain such as an alkyl or alkoxy group and n is an integer having a value of at least 1. Also, rod-like mesogens in which at least two of the aromatic rings are linked through suitable groups such as $-N=EN-$; $-N=NO-$; $-CH=CH-C\equiv C-$; or $-CO_2-CH=N-$ groups. These rod like mesogens form either smectic or nematic phases.

A further group of compounds which can form radical salts are liquid crystal polymers in which any of the above mesogenic units are incorporated either in the main chain backbone or attached in one or more pendant side chains.

The radical salts of such mesogens conduct in only one or two clearly preferred dimensions when appropriately oriented and such oriented materials represent a further preferred aspect of our invention.

The radical salts of the mesogens may be formed by doping the mesogen with an oxidizing or a reducing agent. The nature of the dopant and the quantity in which it is employed should be selected so as not to alter either the structure or the stability of the mesophase to any significant degree. Preferably the dopant is utilised in a quantity which is not more than 0.5 moles per mole of mesogen and is preferably not more than 0.25 and most preferably not more than 0.1 moles per mole of mesogen. In general the conductivity of the mesogen will be proportional to the quantity of dopant which is utilised. It will be appreciated that where the charge is delocalised the material does not exist as a mixture of the mesogen and its radical salt but rather as a mesogen having a net excess or deficiency of electrons. Nevertheless for convenience this description refers to the formation of a radical salt in these circumstances.

A wide variety of dopants may be utilised. Examples of dopants which may be useful include electron acceptors such as iodine, aluminium trichloride, aluminium tribromide and antimony pentafluoride and electron donors such as dimethyl sulphide and lithium metal.

The dopant used to form the radical salt of the particular mesogen is preferably one which is miscible with the mesogen; at least in the quantity which is to be employed. The particular quantity which is preferably added varies with the nature of the mesogen for each particular dopant.

The formation of the radical salt is preferably carried out by heating a mixture of the dopant and the mesogen at a temperature at which they form an isotropic phase in the absence of oxygen. The temperature will usually be above or very close to the temperature at which the mesogen forms an isotropic phase since the presence of the dopant depresses this transition temperature to some extent. Such processes are believed to be novel and constitute a further aspect of this invention.

The formation of a radical salt of the mesogen may be confirmed by esr spectroscopy. The crystalline, liquid crystal and isotropic phases each exhibit characteristic esr spectra. The fact that these phases are formed is indicative of a dopant which has not disturbed the general phase behaviour of the mesogen.

The conductance of the doped mesogen is at least three and preferably at least five orders of magnitude greater than that of the undoped mesogen.

The anisotropic conductivity properties are exhibited when the doped mesogen is oriented in the mesophase. The degree of anisotropy of the conducting properties is proportional to the degree of orientation of the molecules in the mesophase. The preferred liquid crystals of this invention have a conductance In one or two dimensions which is at least 1.1 times and preferably 10 times greater than its conduction in at least one other dimension.

This anisotropy of conductance may be preserved when the doped oriented material is cooled into the crystalline phase. Crystalline phases of the mesogens of this invention which exhibit anisotropic conductivity form a preferred aspect of this invention.

The conduction properties of the novel liquid crystalline materials of this invention and the ease with which they can be fabricated as thin films render them useful In a variety of electronic, thermo-electronic and optoelectronic devices. The changes in the order of the materials which can be achieved by heating directly or with a laser or by the application of localised magnetic or electrical fields can be detected by changes in the conductivity and hence the materials may be useful in temperature sensors and information storage devices. The unique optical properties of the materials renders them useful in non-linear optics and other electro-optic applications. Electronic devices and electro-optic devices incorporating the novel materials form another aspect of our invention.

BRIEF DESCRIPTION OF THE DRAWINGS

The drawings will now be described in more detail with reference to the following example and drawings, in which.

The discotic mesogen 2,3,6,7,10,11-hexa-hexyloxy-triphenylene (HAT6)

HAT6

Figure 1:
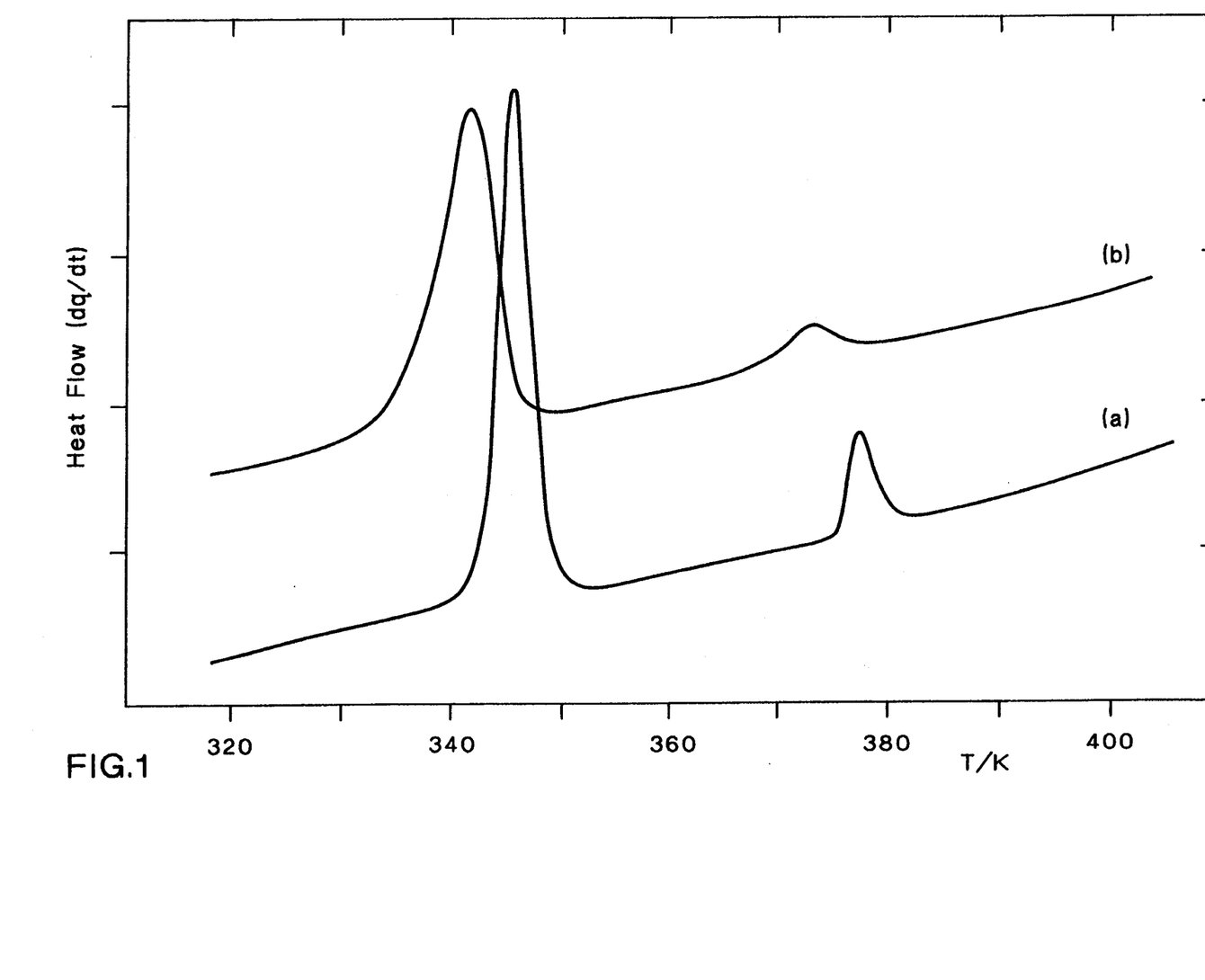
FIG. 1 is a thermogram of undoped HAT 6 and doped HAT 6.

R = (CH$_2$)$_5$CH$_3$ was synthesised by chloranil oxidative trimerisation of veratrole, demethylation with hydrogen bromide, and alkylation of the hexaphenol produced. Doping was carried out under a vacuum by heating a mixture of HAT6 and AlCl$_3$ to 373 K. Transition temperatures were measured using a Perkin-Elmer DSC2 using indium as a calibration standard. The thermogram (FIG. 1) of undoped HAT6 shows two endothermic peaks, corresponding to the crystal to columnar phase transition at 343 K., and the columnar to isotropic phase transition at 373 K. On doping with 1 mole per cent of AlCl$_3$ the transition temperatures are depressed (340 K. and 370 K.) and the endotherms are broadened.

Figure 2:
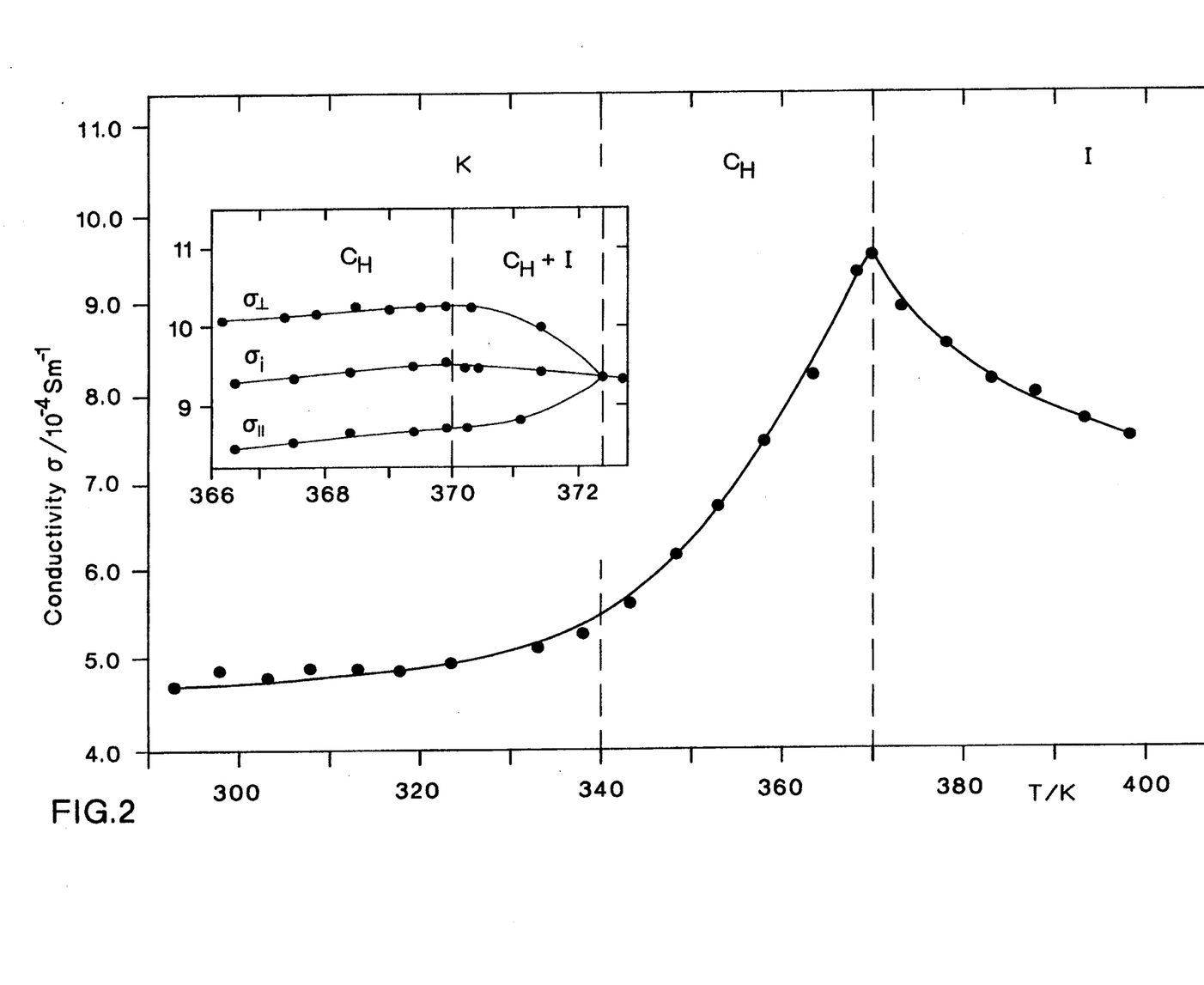
FIG. 2 shows the variation of conductivity with temperature.

A.C. electrical conductivity measurements were made using a Hewlett Packard model 4192 a Impedance Analyser and a sample cell with 5×5 mm platinum electrodes coated with platinum black, and with separation 5 mm. The conductivity of HAT6 changes by at least six orders of magnitude when doped with AlCl$_3$ from less than $10^{-10}$ S m$^{-1}$ to approximately $10^{-4}$–$10^{-3}$ S m$^{-1}$. In all three phases, the conductivity was found to be constant between 5 Hz and 25 kHz and then to increase approximately linearly with increasing frequency. The variation of the conductivity with temperature is shown in FIG. 2.

Figure 3A:
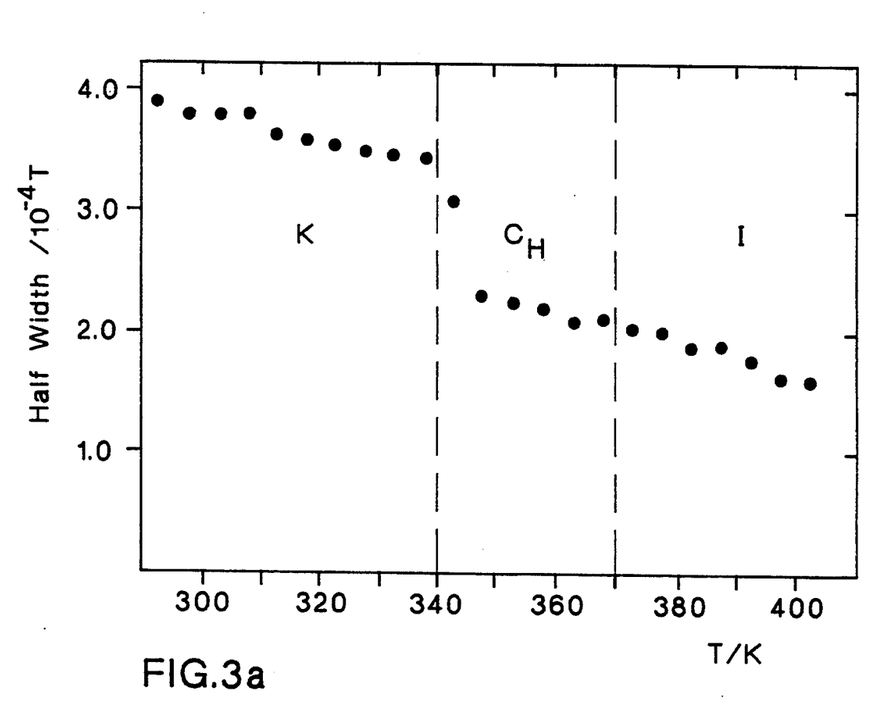
FIG. 3a shows the variation of linewidth with temperature.
Figure 3B:
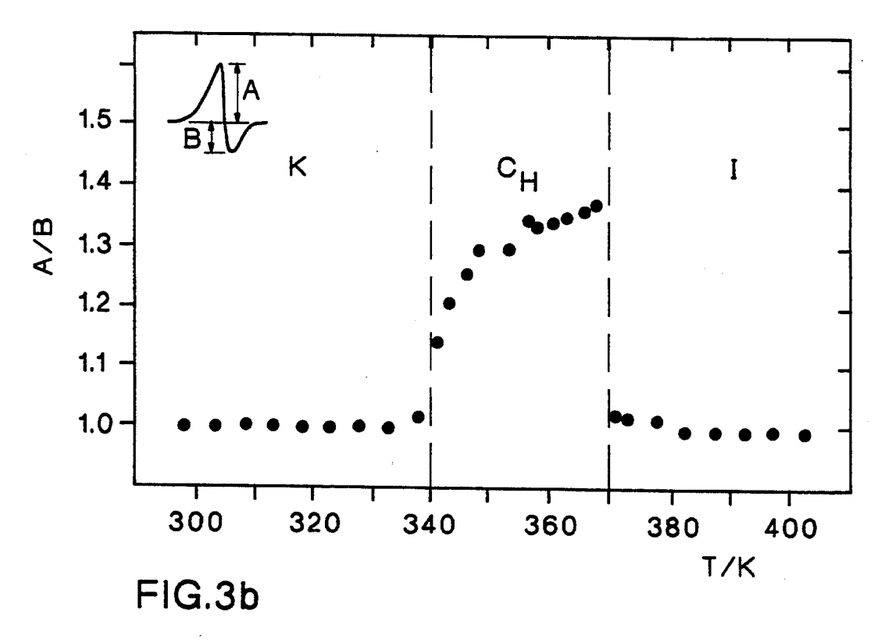
FIG. 3b shows the variation of the esr signal with temperature.

Esr measurements were made on a sample contained under vacuum in a quartz tube of internal diameter 3 mm and filled to a depth of 15 mm using a Bruker ER 200 X-Band esr spectrometer. A modulation amplitude of $1.25 \times 10^{-5}$ T was used for all measurements. For undoped HAT6, the esr signal is a single line of negligible intensity in all of the three phases, whilst for doped HAT6 the intensity of the line increases by at least five to six orders of magnitude. The intensity of the signal remained constant over the whole of the measured temperature range (293–403 K.). In the crystalline phase, the signal has a Lorentzian shape, and there is a small yet steady decrease in the linewidth with increase in temperature (FIG. 3$a$). At the crystal to columnar phase transition there are two distinct changes in the esr signal: (1) the linewidth decreases sharply by a factor of approximately 1.5; (2) the linewidth becomes asymmetric, the asymmetry increasing with increasing temperature (FIG. 3$b$).

Figure 4:
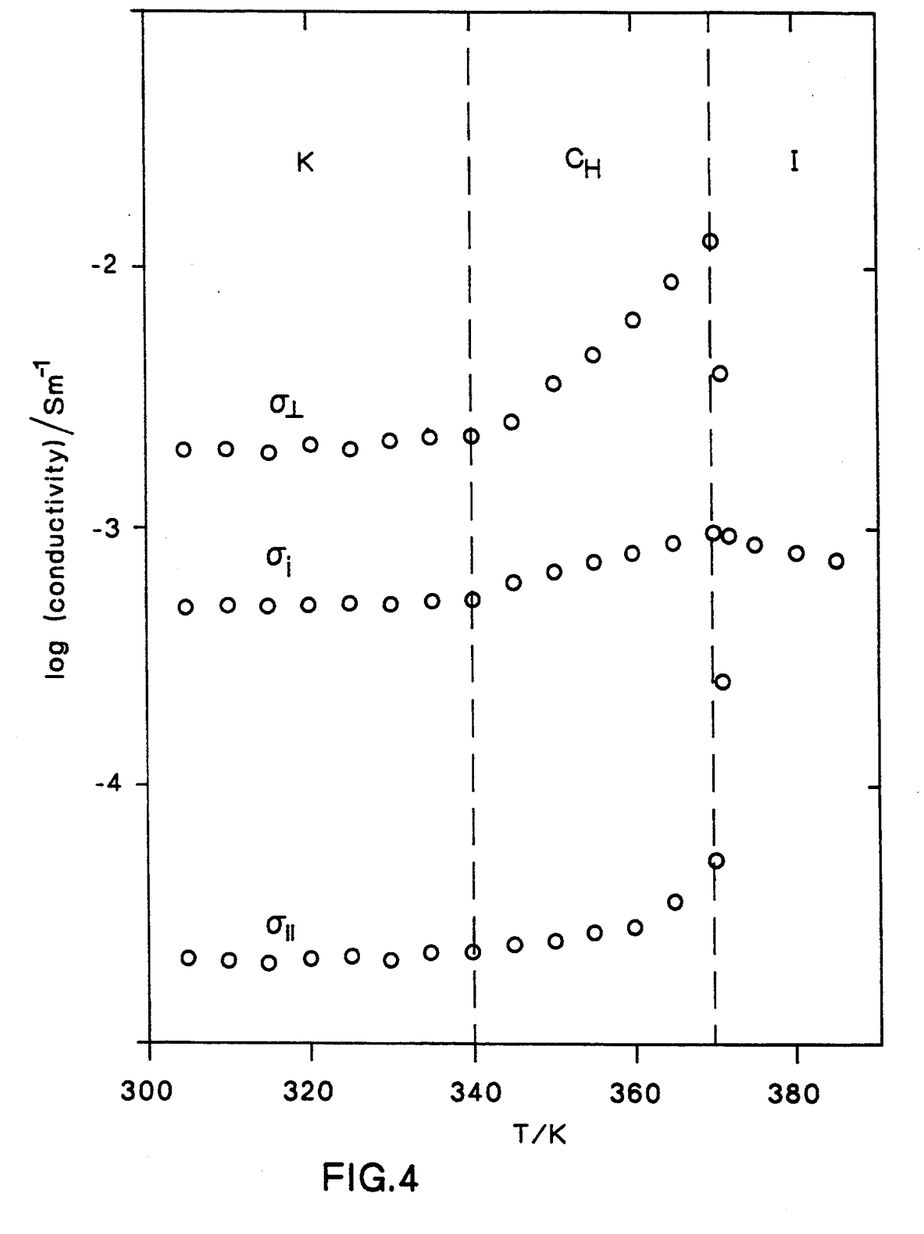
FIG. 4 shows the variation in conductivity with temperature.

Orienting the columnar phase by cooling from the isotropic phase in the presence of a magnetic field (field strength 1.6 T) produced a significant degree of anisotropy (approximately $^{-2}$ $10^{-2}$ S m$^{-1}$). This anisotropy of conductivity was preserved on cooling into the crystalline phase. The variation of conductivity with temperature is shown in FIG. 4. O$\perp$ is the conductivity measured perpendicular to the magnetic field and O$-^{11}$ is that measured parallel to the magnetic field. O$-$ is the electrical conductivity of the unaligned sample.

Doping of the HAT6 mesogen with aluminium tribromide, iodine and antimony pentafluoride also produced a radical salt of the mesogen which when suitably aligned exhibited anisotropic conduction properties.

Similarly doping of the mesogens 2,3,6,7,10,11-hexahexylthiotriphenylene (HTT6) and 2,3,6,7,10,11-hexa(-paraundecyloxybenzoyloxy)triphenylene (HBT11) with aluminium trichloride, aluminium tribromide, iodine or antimony pentafluoride resulted in the production of a radical salt of the mesogen.

We claim:

1. A semi-conducting liquid crystalline material exhibiting anisotropic conducting properties, comprising a radical salt of a disc-like mesogen and a dopant which is one only of an oxidizing or a reducing agent, wherein not more than 0.5 moles of dopant per mole of mesogen are present, said dopant being selected from the group consisting of aluminum trichloride, aluminum tribromide, iodine and antimony pentafluoride.

2. A material according to claim 1, wherein said mesogen is a hexa-n-alkanoate of triphenylene or a hexa-n-alkoxy triphenylene.

3. A material according to claim 2, wherein said mesogen is 2,3,6,7,10,11-hexa-hexyloxy triphenylene.

4. A material according to claim 2, wherein said mesogen is 2,3,6,7,10,11-hexa-hexylthiophenylene.

5. A material according to claim 1, wherein said mesogen is 2,3,6,7,10,11-hexa-(paraundecyloxybenzoyloxy) triphenylene.

6. A material according to claim 1, wherein not more than 0.25 moles of dopant per mole of mesogen are present.

7. A material according to claim 1, wherein the conductance of the liquid crystalline material in at least one dimension is 1.1 times greater than its conductance in one other dimension.

8. A material according to claim 7, wherein the conductance of the liquid crystalline material in at least one dimension is at least 10 times greater than its conductance in one other dimension.

9. A material according to claim 1, wherein said material is in its crystalline phase.

10. An electronic device incorporating at least one semi-conducting liquid crystalline material according to claim 1.

11. A semi-conducting liquid crystalline material exhibiting anisotropic electronic conduction properties, comprising a radical salt of a mesogen and a dopant which is one only of an oxidizing or a reducing agent, wherein not more than 0.5 moles of dopant per mole of mesogen are present, said mesogen comprising a polyaromatic moiety the formula:

wherein X is a C$_{1-4}$-alkyl or alkoxy group, said dopant being selected from the group consisting of aluminum trichloride, aluminum tribromide, iodine and antimony pentafluoride.

12. A material according to claim 1, wherein said material is in its crystalline phase.

13. A process for the production of a semi-conducting liquid crystalline material exhibiting anisotropic conduction properties, which process comprises the steps of:
  mixing a disc-like mesogen and a dopant which is an oxidizing or a reducing agent, and
  heating the mixture in the absence of oxygen, wherein not more than 0.5 moles of dopant per mole of mesogen are present.

14. A process according to claim 13, wherein said mixture is heated to a temperature at which an isotropic phase is formed.

15. An electronic device incorporating at least one semi-conducting liquid crystalline material prepared according to the process of claim 13.

* * * * *